No. 651,125. Patented June 5, 1900.
A. STILES.
BICYCLE ATTACHMENT.
(Application filed Aug. 19, 1899.)
(No Model.)
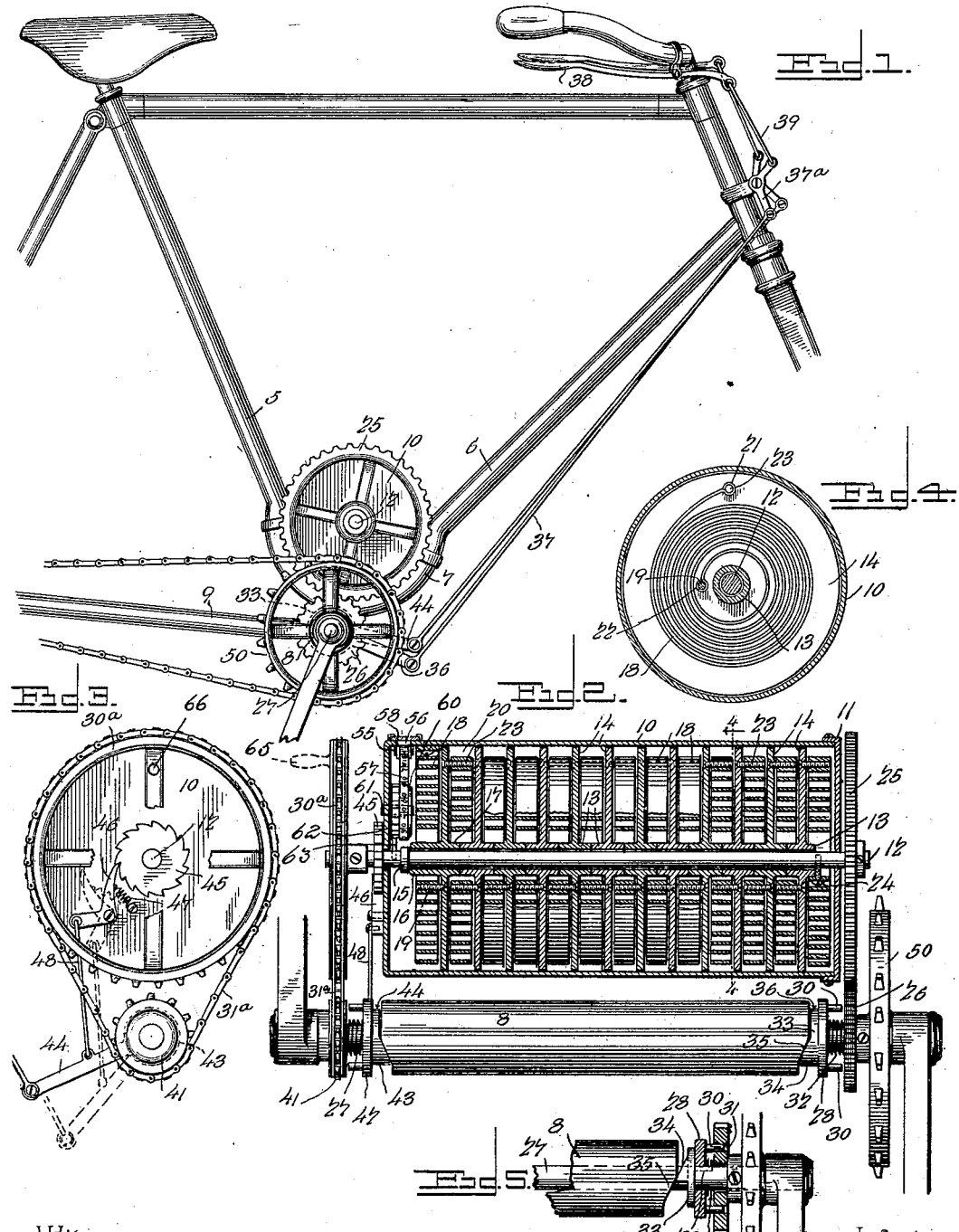
Witnesses
E. F. Stewart
Grant Chandler
By their Attorneys, Archibald Stiles
C. A. Snow & Co.
Inventor

UNITED STATES PATENT OFFICE.

ARCHIBALD STILES, OF STEPHENSPORT, KENTUCKY, ASSIGNOR OF ONE-FOURTH TO MICHAEL BLAIN, OF SAME PLACE.

BICYCLE ATTACHMENT.

SPECIFICATION forming part of Letters Patent No. 651,125, dated June 5, 1900.

Application filed August 19, 1899. Serial No. 727,839. (No model.)

*To all whom it may concern:*

Be it known that I, ARCHIBALD STILES, a citizen of the United States, residing at Stephensport, in the county of Breckinridge and State of Kentucky, have invented a new and useful Bicycle Attachment, of which the following is a specification.

This invention relates to bicycle attachments, although it will be readily seen from the following description that it may be employed in connection with a vehicle for any purpose, the object of the invention being to provide means for storing up the energy ordinarily absorbed by a brake and to subsequently utilize that energy to drive or assist in driving the bicycle or other vehicle to which it may be attached.

The invention consists of a preferably cylindrical casing fixed above the crank-hanger of a bicycle and containing a plurality of coaxial spiral springs mutually connected and adapted to exert a rotary pressure upon a shaft which is adapted to be thrown into and out of operative relation to the crank-axle of the bicycle.

In the drawings forming a portion of this specification, and in which similar numerals of reference designate corresponding parts in the several views, Figure 1 is a side elevation of a portion of a bicycle and showing the location of the attachment. Fig. 2 is a vertical section of the casing containing the springs, some of the springs being in elevation and some in section, while the power-shaft within the casing, the adjacent portion of the crank-hanger and crank-axle, and the connected parts are in elevation. Fig. 3 is an end view of Fig. 2 looking to the right. Fig. 4 is a section on line 4 4 of Fig. 2. Fig. 5 is a detail section of the clutch mechanism.

Referring now to the drawings, 5 represents the seat-tube, and 6 the bottom bar, of a bicycle-frame, the lower ends of which conform to the curvature of and are connected with an arc-shaped bracket 7, fixed to the crank-hanger 8, which latter has the usual location. Attached also to the crank-hanger are tie-rods 9, leading rearwardly of the frame.

Seated in the arc-shaped seat formed by the bracket 7 is a cylindrical casing 10, closed at one end and having a removable cover 11 at the opposite end to permit the introduction and removal of the parts inclosed thereby.

Longitudinally of and concentric with the casing 10 is a power-shaft 12, having bearings in the ends of the casing and projecting outwardly therebeyond. Mounted loosely upon the shaft 12 is a series of hubs 13, supporting centrally-disposed rotatable disks 14, the inward movement of the hubs being limited by a collar 15 upon the shaft 12 adjacent the closed end of the casing and each hub being in contact with the hubs adjacent thereto.

The hub upon the shaft 12 adjacent the collar 15 has a major and a minor extension 16 and 17, respectively, at opposite sides of its disk, the major extension being in the direction of the collar 15. Disposed concentric with and encircling the major extension 16 is a spiral spring 18, the outer end of which is fixed to the inner surface of the casing 10 and the inner end of which is fixed to the adjacent face of the disk connected with said extension through the medium of a screw 19 or in any other desired manner.

The minor extension 17, in connection with the adjacent extension of the succeeding hub, acts to separate their respective disks and result in the formation of an interspace 20, similar interspaces of equal dimensions separating each pair of disks. In the first-named interspace 20 and encircling the minor hub extension 17 and the contacting extension of the following hub is a helical spring, the outer end of which is fixed to the disk of the extension 17, and the inner end of which is fixed to the face of the disk at the opposite side of the spring. The method of thus connecting is preferably by the formation of eyes 21 and 22 in the outer and inner ends of the springs and through which are passed screws 23. A spring is similarly arranged in each interspace 20, and between the removable end of the casing 10 and the disk adjacent thereto there is arranged a similar spiral spring, the outer end of which is fixed to or connected with the adjacent disk and the inner end of which is fixed to the shaft 12 through the medium of the screw 24 or in any other manner, as may be preferred. Thus it will be seen that if the shaft 12 be rotated motion will be contributed to the entire series of springs, which will be successively moved initially and may be wound up to their maximum tensions. In order to thus wind up the springs, the protruding end of the shaft 12 at one end of the casing is provided with a gear-wheel 25, fixed thereto, and which is in constant engagement with a pinion 26, mounted loosely upon the crank-shaft 27 within the hanger 8. The gear 25 is shown as disposed adjacent the removable end of the casing, although it will be readily understood that it may be at the opposite end of the shaft.

In order to clutch the disk 26 at times to rotate with the crank-shaft 27, a clutch-disk 28 is splined upon the crank-shaft, as shown at 29, to rotate therewith and to move longitudinally thereof, said disk having pins 30, adapted to enter perforations 31 in the face of the pinion 26 to cause said pinion to rotate with the clutch-disk. The pins 30 are normally held from engagement with the perforations 31 through the medium of a helical spring 32, disposed upon the crank-shaft intermediate the pinion and the clutch-disk, and in order to move the clutch-disk against the tendency of the spring a ring 33 is rotatably mounted upon the crank-shaft and having a flat face in contact with the clutch-disk. The opposite face of the ring 33 has a cam projection 34, adapted to coöperate with a cam 35 upon the adjacent end of the crank-hanger 8 to move the ring longitudinally of the shaft when said ring is rotated to cause operative engagement of the cam-faces. A lever 36, fixed to the rim 33, has a connecting-rod 37 at its end leading to an angular lever 37$^a$, pivoted to the head of the bicycle-frame and having connection with a hand-lever 38 through the medium of a link 39, whereby the operation of the hand-lever may oscillate the ring 33 to move the cams into and out of operative relation.

In order to transmit the energy of the shaft 12 to the shaft 27 and to cause similar rotation of the shaft, it being understood, of course, that in the winding up of the springs the shaft 12 rotates in a direction opposite to that of the shaft 27, a sprocket-wheel 30$^a$ is fixed to the shaft 12 at the opposite end from the gear 25 and has a chain connection 31$^a$ with a smaller sprocket-wheel 41, arranged loosely upon the shaft 27 in the same manner as the pinion 26 and having a similar clutch and clutch-operating mechanism, comprising a clutch-disk 42 and cam-ring 43, which latter is provided with a lever 44.

In the winding up of the springs it is of course necessary to throw the pinion 26 into operative relation and the sprocket 41 out of operative relation to the shaft 27 and also when the spring is wound up to its limit and it is not desired to then utilize the energy of the spring rotation of the shaft 12 when the pinion 26 is released by its clutch must be prevented. For this purpose a ratchet-disk 45 is secured to the shaft 12 intermediate the sprocket 30$^a$ and the casing 10 and is adapted for engagement by a pawl 46, which is pivoted to the adjacent end of the casing and held in normal engagement with the ratchet-disk by means of a spring 47. When the lever 44 is operated to clutch the sprocket 41 to the crank-shaft, it is of course necessary to move the pawl 46 from the ratchet-wheel, and for this purpose said pawl has its outwardly-directed end 47 connected with the lever 44 by means of a link 48, and thus as the lever 44 is moved and after the pins of the clutch-disk have initially engaged sprocket 41 the pawl will be moved to release its ratchet and the energy of the springs will be communicated through the drive-shaft 12 and the sprockets and chain to the crank-shaft and in the direction of forward rotation of the latter.

The crank-shaft 27 has the usual sprocket 50, connected by means of a chain with a rear sprocket, and in practice it is preferred that the ratio of the gear and pinion be substantially the same as that of the sprocket 50 and the rear sprocket, although the proportions may be varied as desired.

In practice the specific construction of the frame to accommodate this attachment may be varied and if desired the casing may be so located and the transmitting mechanism between the shafts may be so disposed as to permit the application of the attachment to a bicycle-frame of usual form; also, any desired arrangement for throwing the clutches into and out of operative positions, as well as any specific form of clutch, may be employed and the appliance may be attached to any vehicle to which it is adapted.

In the operation of this apparatus it is of course desirable that the rider be informed when the springs are at their maximum tensions and also the different degrees of tension of the springs at different times, so that he may know when to throw the winding mechanism into or out of gear and may also know the amount of energy contained in accordance with a suitable arbitrary scale. For this purpose a roller 55 is journaled upon the inner face of the casing 10 and just below an opening 56 therein, and over this roller is passed a belt 57, in operative engagement with the drum 60, to be moved by the latter transversely of said opening, the belt having a suitable scale printed thereon. A transparent closure 58 is provided for the opening 56.

In order to rotate the drum 60, it is mounted upon the stub-shaft 61, fixed upon one end of the casing, that end of the drum 60 adjacent to the end of the casing being provided with gear-teeth 62, which are adapted for successive engagement by a radial pin 63 upon the shaft 12. Thus for each rotation of the shaft 12 the gear 62 will be rotated one tooth and will correspondingly move the belt 57 to show the proper numeral thereon.

In the use of this apparatus in localities where hills are scarce it is desirable to provide means for winding the several springs by hand, and for this purpose a handle (shown in dotted lines at 65 in Fig. 2 of the drawings) may be screwed into a perforation 66 in one of the spokes of the sprocket-wheel 30ª. By then throwing the clutch mechanisms to the proper positions the handle may be manipulated to rotate the sprocket and wind the springs.

Having thus described the invention, what I claim is—

1. A device of the class described, comprising a casing, a shaft rotatable in the casing, a plurality of disks mounted loosely upon the shaft, a plurality of spiral springs, one of said springs having one end fixed to the casing and its opposite end fixed to the adjacent disk, another spring having one end fixed to the shaft and its opposite end to an adjacent disk, additional springs intermediate the remaining disks and each spring having one end fixed to a disk at one side and its other end fixed to a disk at the opposite side of the spring, means for rotating the shaft to wind the springs, means for drawing the winding means into and out of operative relation to the shaft, means for holding the shaft against rotation when the winding means is released, and means adapted to be thrown into and out of operative relation to the shaft to transmit motion of said shaft, and connections between the last-named means and the shaft-holding means for releasing the latter.

2. A device of the class described, comprising a rotatable shaft and a fixed support, spiral springs encircling the shaft, one of said springs having an end fixed to the support and its opposite end connected with the end of a similar spring, the opposite end of said similar spring being fixed to the shaft, means for rotating the shaft to wind the springs, means for throwing the rotating means into and out of operative relation to the shaft, means for holding the shaft against the influence of the springs when the rotating means is released, power-transmitting means adapted to be thrown into and out of relation to the shaft, and connections between the last-named means and the holding means for releasing the latter.

In testimony that I claim the foregoing as my own I have hereto affixed my signature in the presence of two witnesses.

ARCHIBALD STILES.

Witnesses:
HERMAN D. LAY,
SAM C. DANIEL.